(12) United States Patent
Satoh et al.

(10) Patent No.: US 8,244,790 B2
(45) Date of Patent: Aug. 14, 2012

(54) MULTIPLIER AND CIPHER CIRCUIT

(75) Inventors: Akashi Satoh, Yamato (JP); Kohji Takano, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 2701 days.

(21) Appl. No.: 10/762,174

(22) Filed: Jan. 21, 2004

(65) Prior Publication Data

US 2004/0177105 A1 Sep. 9, 2004

(30) Foreign Application Priority Data

Jan. 23, 2003 (JP) .................................. 2003-015301

(51) Int. Cl.
*G06F 7/52* (2006.01)
(52) U.S. Cl. ......................................... 708/629; 708/492
(58) Field of Classification Search .................. 708/629, 708/492
See application file for complete search history.

(56) References Cited

U.S. PATENT DOCUMENTS

| | | | | |
|---|---|---|---|---|
| 5,257,217 A | * | 10/1993 | Chiu .............................. | 708/629 |
| 5,847,981 A | * | 12/1998 | Kelley et al. .................. | 708/603 |
| 5,943,250 A | * | 8/1999 | Kim et al. ...................... | 708/625 |
| 6,421,699 B1 | * | 7/2002 | Dhong et al. .................. | 708/630 |
| 6,442,582 B1 | * | 8/2002 | Hale .............................. | 708/629 |
| 2003/0110197 A1 | * | 6/2003 | Hansen et al. ................ | 708/620 |

OTHER PUBLICATIONS

1. Johann Großschadl, "A Bit-Serial Unified Multiplier Architecture for Finite Fields GF($p$) and GF($2^{1}m$)," CHES 2001, LNCS 2162, pp. 202-219, 2001.

* cited by examiner

*Primary Examiner* — Tan V. Mai
(74) *Attorney, Agent, or Firm* — William Stock; Ryan, Mason & Lewis, LLP

(57) ABSTRACT

A multiplier circuit is disclosed including a Wallace tree block and a carry propagation adder. The Wallace tree block includes a sum calculation block adding partial products for each digit and a carry calculation block adding carries obtained in the addition by the sum calculation block. In the case of multiplication over an extension field (finite field GF($2^n$)) of two, a result of calculation by the sum calculation block is outputted. The carry propagation adder adds the result of calculation by the sum calculation block and a result of calculation by the carry calculation block. In the case of multiplication for integers (finite field GF(p)), a result of calculation by the carry propagation adder is outputted.

13 Claims, 11 Drawing Sheets

FIG. 9

US 8,244,790 B2

MULTIPLIER AND CIPHER CIRCUIT

FIELD OF THE INVENTION

The present invention relates to an arithmetic unit used for a processor of a computer and the like and, more specifically, relates to a multiplier unit performing finite field arithmetic.

BACKGROUND OF THE INVENTION

Today, for a public key cryptosystem, a Rivest Shamir Adleman (RSA) system is mainly used, which utilizes modular exponentiation (arithmetic on a finite field GF(p), where GF(p) is a set of remainders when an integer is divided by a prime number p). In the public key cryptosystem, the longer the key length (bit number) becomes, the more security is enhanced. However, in the RSA system, the key length necessary for adequate practical security has increased from 512 bits to 1024 bits and to 2048 bits, so that increase in operation time and hardware resources has become a problem. On the contrary, in a public key cryptosystem using elliptic curve cryptography (hereinafter, referred to as an elliptic curve cryptosystem), arithmetic of 160 or 224 bits can ensure the security equivalent to the RSA system with a key length of 1024 or 2048 bits.

The basic arithmetic in the elliptic curve cryptography is broadly classified into arithmetic based on GF(p), same as that of the RSA cryptography, and arithmetic based on an extension field $GF(2^n)$ of GF(2). The arithmetic over $GF(2^n)$ is based on exclusive OR (XOR) and has no carry generated in addition. Therefore, the arithmetic over $GF(2^n)$ is faster compared to the arithmetic over GF(p) by modular arithmetic of integers. However, in the elliptic curve cryptosystem on $GF(2^n)$, modular multiplication over GF(p) is also necessary in order to support signature by an elliptic curve digital signature algorithm (EC-DSA), which is one of the most important algorithms (for example, see Robert J. McEliece, "The Theory of Information and Coding," Cambridge University Press, 2002).

As an algorithm performing modular multiplication at high speed, there is Montgomery multiplication (for example, see Johann Groszschaedl, "A Bit-Serial United Multiplier Architecture for Finite Fields GF(p) and GF(2m)," C. K. Koc, D. Naccache, and C. Paar (Eds.): CHES 2001, LNCS 2162, p. 202-219, 2001. Springer-Verlag Berlin Heidelberg 2001). The algorithm was initially for GF(p) and based on adders, but the algorithm today is extended to an algorithm using multipliers or arithmetic over $GF(2^n)$.

As described above, in the case where the public key cryptography is realized by the elliptic curve cryptography, it is required to perform the arithmetic over GF(p) and arithmetic over $GF(2^n)$. Accordingly, the cipher circuit needs a multiplier performing the arithmetic over GF(p) and a multiplier performing the arithmetic over $GF(2^n)$.

Herein, in the case of a circuit using multipliers of eight bits or so, even if the circuit is constituted in such a manner that both of the multipliers performing the arithmetic over GF(p) and performing the arithmetic over $GF(2^n)$ are mounted and switched by a selector, circuit size is less affected. However, in the case of using a multiplier of 32 or 64 bits for higher speed, the number of gates of the multiplier is increased by the order of the square of the increased bit numbers, and the numbers of selectors and wires are increased. Accordingly, when both of the multipliers performing the arithmetic over GF(p) and performing the arithmetic over $GF(2^n)$ are mounted, the increase in circuit size is not negligible.

Therefore, in the case of the cipher circuit performing arithmetic of numbers of 160 or 1024 bits handled in the public key cryptography, for miniaturization of a device with the cipher circuit mounted thereon or the cipher circuit itself, it is not preferred to separately mount the multipliers performing the arithmetic over GF(p) and performing the arithmetic over $GF(2^n)$.

In the Montgomery multiplication or the elliptic curve cryptography, algorithms of the arithmetic over GF(p) and the arithmetic over $GF(2^n)$ are substantially the same. Accordingly, when the arithmetic is implemented by circuits, data paths are mostly sharable without change except a multiplication core itself. The above-referenced J. Groszschaedl article discloses a multiplier sharable by the arithmetic over GF(p) and $GF(2^n)$.

However, such a conventional multiplier is a serial multiplier, which calculates a product by repeatedly using an adder as many times as the number of bits. In the arithmetic over $GF(2^n)$, the conventional multiplier simply disables carries. In order to perform integer multiplication with the serial multiplier, it is necessary that the carry is propagated for each cycle from the least significant bit (LSB) to the most significant bit (MSB) or an intermediate result is retained in a register of a size twice the number of bits while remaining as a redundant binary number. Accordingly, it is difficult to speed up arithmetic, and for speeding up, the circuit size should be considerably increased.

Moreover, as previously described, the public key cryptography handles numbers of 160 or 1024 bits, and the cipher circuit thereof uses a very long adder for speeding up. Therefore, in order to transfer data at high speed, a bus width needs to be extended to the bit length of the adder, thus increasing a chip size physically. Moreover, it is almost impossible to generate a physical ASIC (application specific integrated circuit) chip image that has a bus with two inputs of 1024 bits and an output of 1024 bits by using an automatic place-and-route tool. It usually requires a complicated work such as custom layout by hand. On the other hand, if the bus width is not extended, it is necessary to control the adder to wait for data as objects of arithmetic to be collected at the time of execution of the processing, thus lowering the performance.

Hereinabove, the multiplier circuit used for the cipher circuit in the public key cryptography has been discussed. The same holds true of not only cryptography but also various applications that the coding theory is applied to, the applications requiring the arithmetic over GF(p) and the arithmetic over $GF(2^n)$. Examples of another application that the coding theory is applied to include an error correcting circuit by an error correcting code (for example, see Ian Blake, Gadiel Seroussi, and Nigel Smart, "Elliptic Curve Cryptography" Cambridge University Press, 1999; and Richard E. Blahut, "Theory and Practice of Error Control Codes," Addison-Wesley Publishing Company, 1984).

SUMMARY OF THE INVENTION

An object of the present invention is to provide a parallel multiplication circuit available as a usual integer multiplier and a multiplier over $GF(2^n)$ without increasing the circuit in size.

Another object of the present invention is to provide a cipher circuit implementing with one accelerator core the public key cryptography of the modular multiplication system, the cipher circuit including the elliptic curve cryptography or the RSA system, which requires two types of arithmetic over GF(p) and $GF(2^n)$.

The present invention achieving the above described and other objects may be realized as a multiplier. Specifically, this multiplier may include a Wallace tree block calculating partial products for two input values as objects of multiplication and adding the partial products into a redundant binary form; and a carry propagation adder converting a redundant binary number outputted from the Wallace tree block into a two's complement form. The Wallace tree block may include a sum calculation block adding the partial products for each digit, and a carry calculation block adding carries generated by the sum calculation block.

In such a multiplier, in the case of performing multiplication over an extension field (finite field $GF(2^n)$) of 2, a result of addition for each digit except the carries among results of the calculation of the sum calculation block can be outputted as a result of the multiplication. The carry adder adds a result of the calculation of the sum calculation block and a result of the calculation of the carry calculation block. In the case of multiplication for integers, the carry adder can output a result of the addition as a result of the multiplication.

The present invention may be realized as a multiplier configured to multiply two input values as objects of multiplication by calculating partial products for the two input values and to add the partial products using half adders. This multiplier includes: multiplication means for calculating a sum of the partial products for each digit and outputting the sum as a result of the multiplication in the case that the input values are elements in an extension field of 2; carry addition means for adding carries generated in the calculation of the multiplication means; and addition means for adding a result of the calculation of the multiplication means and a result of the calculation of the carry addition means and outputting a result of the addition as a result of the multiplication in the case where the input values are integers.

In this multiplier, the multiplication means collects and outputs only addition terms by an XOR operation to the outside, the addition terms being outputted from the half adders and the full adders. The carry propagation adder means collects all terms other than the addition terms added by the multiplication means and performs addition including carry terms and the addition terms by the half adders and the full adders.

Furthermore, the present invention may be realized as various circuits (applications) including these multipliers mounted as arithmetic means. As a typical example, these multipliers can be mounted on a cipher circuit as an arithmetic unit performing arithmetic for encryption or decryption.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 9 is a view showing an image of a multiply-add operation of adding an 8-bit input to a result of the 8-bit multiplication shown in FIG. 1, according to an embodiment of the present invention;

DETAILED DESCRIPTION OF PREFERRED EMBODIMENTS

Hereinafter, the present invention will be described in detail based on an embodiment shown in the accompanying drawings.

The embodiment realizes arithmetic over GF(p) and arithmetic over $GF(2^n)$ in a parallel multiplier. The parallel multiplier performing multiplication (integer multiplication) over GF(p) is composed of a Wallace tree block and a carry propagation adder. The Wallace tree block adds partial products (products of numbers of each digit) in a carry save form (redundant binary form). The carry propagation adder converts a redundant binary number outputted from the Wallace tree block into a 2's complement form.

When two n-bit numbers $A=(a_{n-1}, \ldots, a_1, a_0)$ and $B=(b_{n-1}, \ldots, b_1, b_0)$ are inputted into the multiplier, the Wallace tree block adds the partial products for each bit with half adders (HAs) and full adders (FAs).

Figure 1:
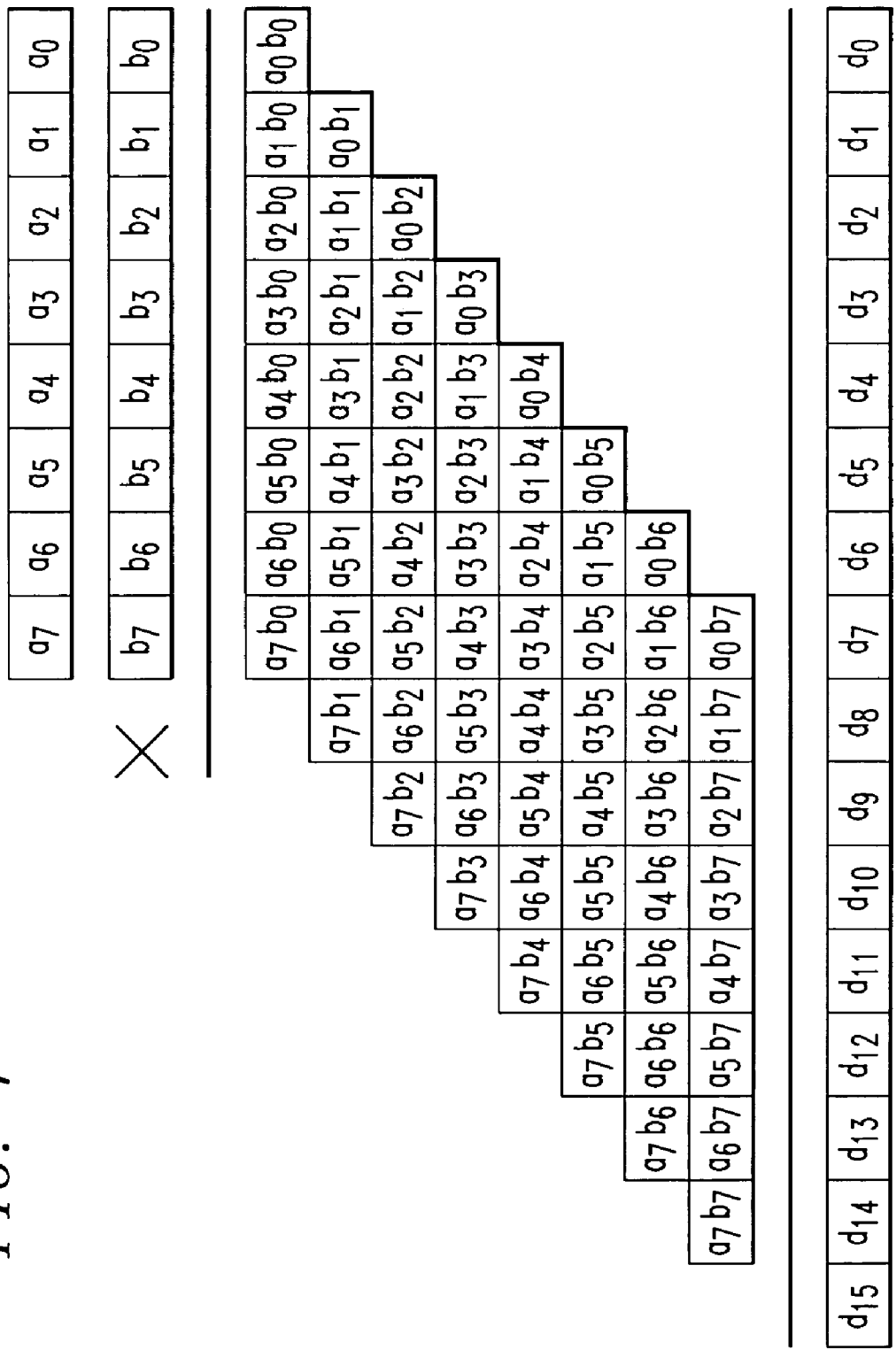
FIG. 1 is a view showing an image of multiplication taking 8-bit inputs as an example, according to an embodiment of the present invention.
Figure 2:
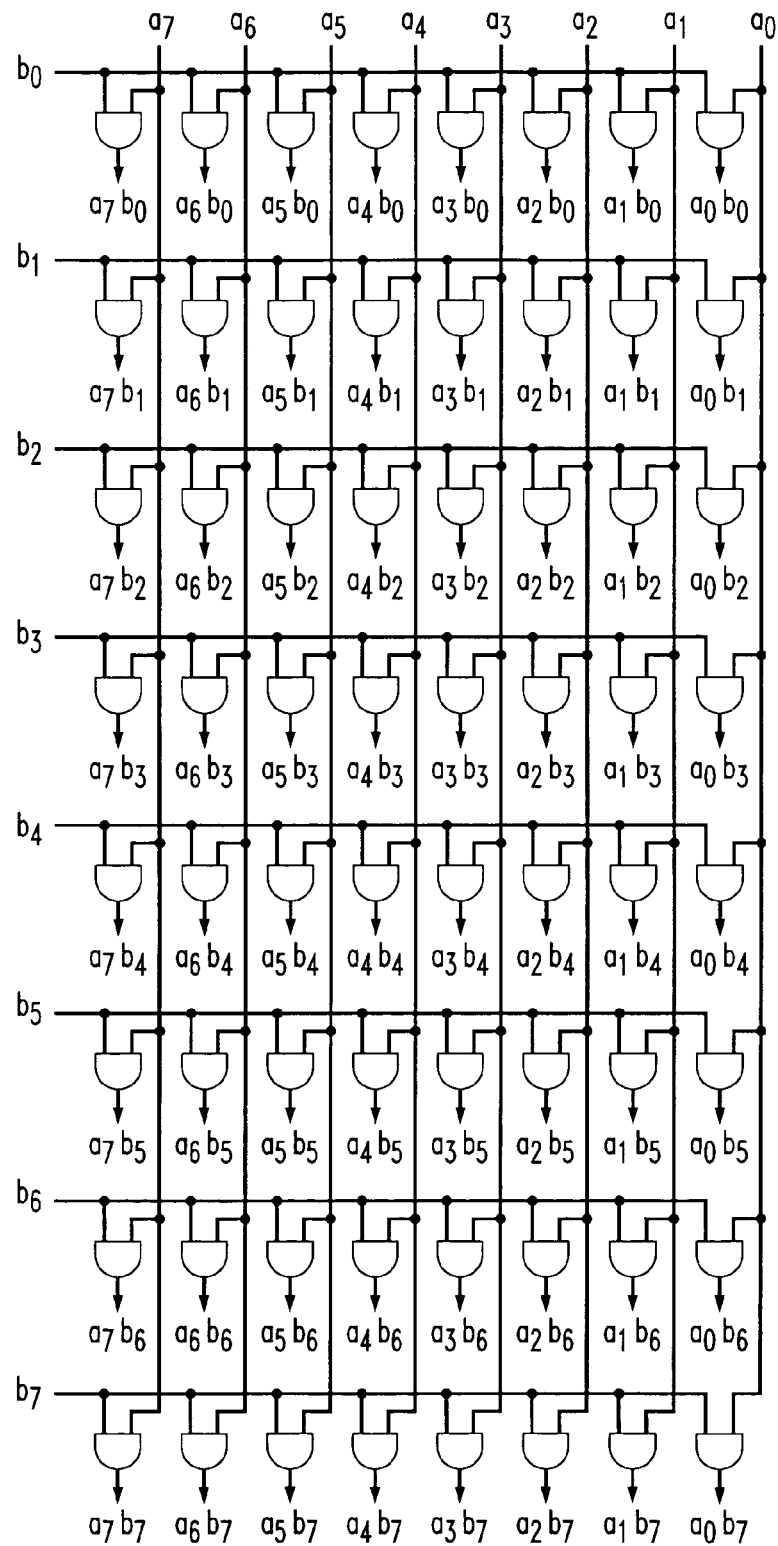
FIG. 2 is a diagram showing circuitry for calculating partial products in the multiplication of FIG. 1, according to an embodiment of the present invention.
Figure 3:
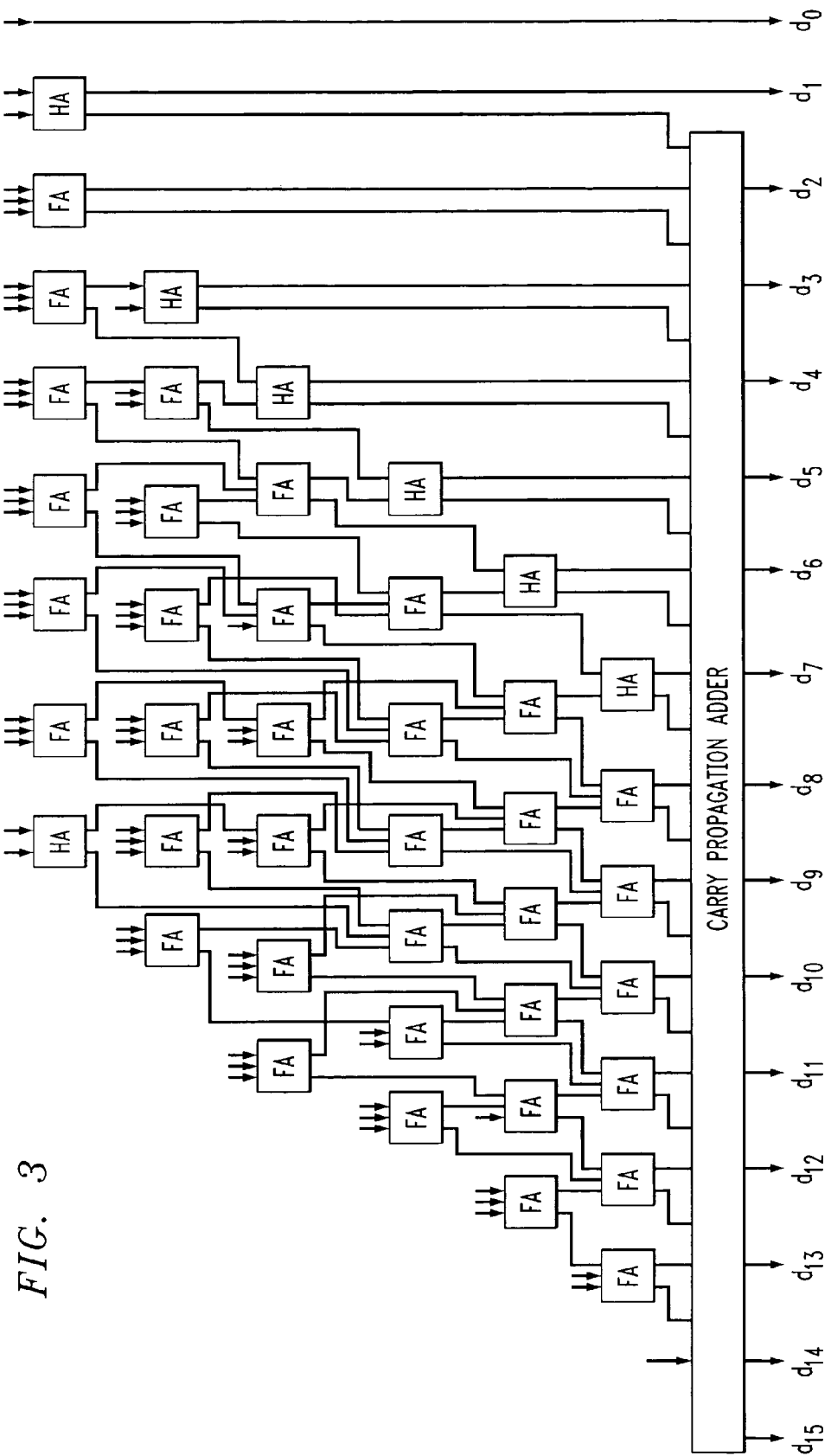
FIG. 3 is a diagram showing circuitry for adding up the partial products calculated in the circuit of FIG. 2, according to an embodiment of the present invention.

FIG. 1 is a view showing an image of multiplication of 8-bit inputs A and B as an example. FIG. 2 is a diagram showing circuitry for calculating the partial products in the multiplication of FIG. 1. FIG. 3 is a diagram showing circuitry for adding up the partial products calculated in the circuit of FIG. 2.

With the circuit shown in FIG. 2, each of $n^2$ partial products $a_i b_j$ (i, j=0, 1, 2, 3, 4, 5, 6, 7) is calculated and transmitted to the full adder or the half adder of a corresponding digit in the circuit shown in FIG. 3. Outputs $(d_0, d_1 \ldots, d_{15})$ of the circuit shown in FIG. 3 are outputted through the carry adder as a result of the multiplication.

Figure 4:
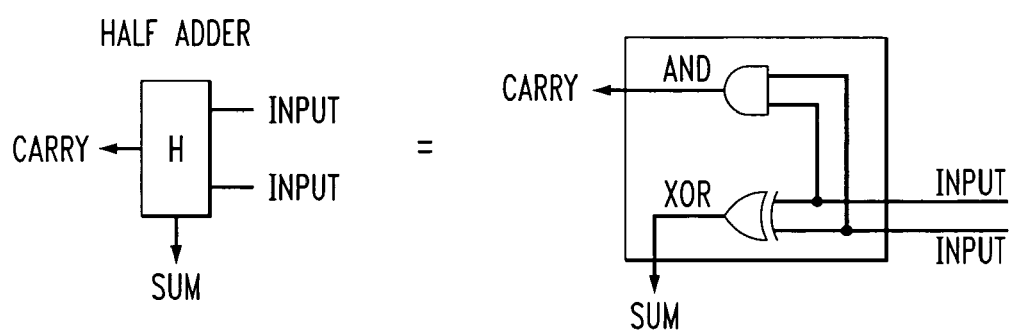
FIG. 4 is a diagram showing a structure of a half adder, according to an embodiment of the present invention.
Figure 5:
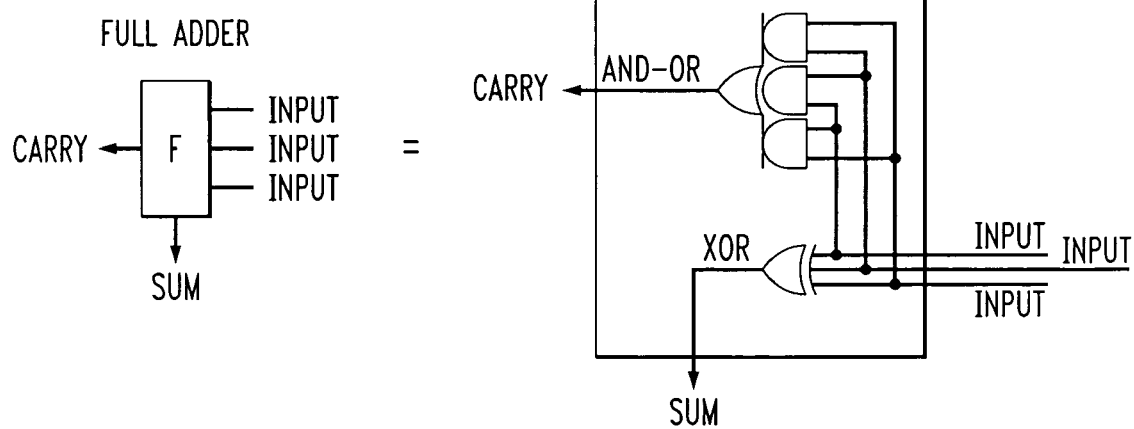
FIG. 5 is a diagram showing a structure of a full adder, according to an embodiment of the present invention.

FIGS. 4 and 5 are diagrams showing a structure of the half adder and the full adder, respectively.

The half adder calculates two bits of a carry and a sum for a 2-bit input as the following equation 1:

$$\text{sum}_{HA}(x_0, x_1) = x_0 \oplus x_1$$

$$\text{carry}_{HA}(x_0, x_1) = x_0 \cdot x_1$$

The full adder calculates two bits of a carry and a sum for three inputs as equation 2:

$$\text{sum}_{FA}(x_0, x_1, x_2) = x_0 \oplus x_1 \oplus x_2$$

$$\text{carry}_{FA}(x_0, x_1, x_2) = x_0 \cdot x_1 + x_1 \cdot x_2 + x_2 \cdot x_0$$

In the equations above, symbols "·" and "+" denote a logical product (AND) and a logical addition (OR), respectively. The operation symbol ⊕ denotes exclusive or (XOR).

Contrary to the above described integer multiplier circuit, the parallel multiplier performing multiplication over $GF(2^n)$ does not generate carries and only XORs all the partial products for each digit in the Wallace tree block. Specifically, in the multiplier circuit performing arithmetic for 8-bit inputs A and B the same as those in FIG. 1, the Wallace tree block includes a similar circuit to that of FIG. 2, which calculates partial products, and a circuit which XORs the obtained partial products for each digit. In the multiplication over $GF(2^n)$, since no carry is generated, a result of the XOR operation for the partial products by the Wallace tree block is directly a result of the multiplication. Accordingly, the conversion by the carry propagation adder is unnecessary.

Figure 6:
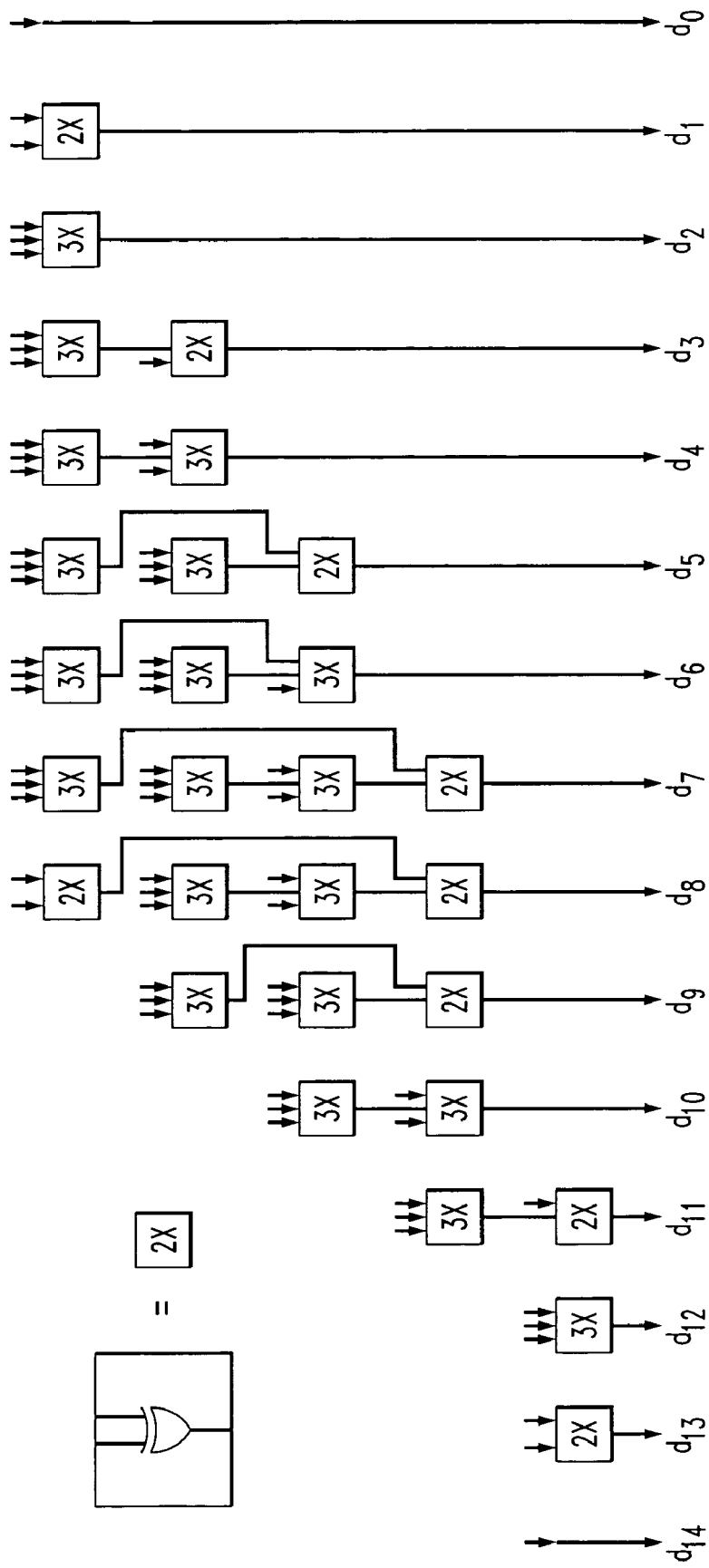
FIG. 6 is a diagram showing circuitry for XORing the partial products calculated in FIG. 2, according to an embodiment of the present invention.

FIG. 6 is a diagram showing a circuitry for XORing the partial products calculated in the circuit of FIG. 2.

In the light of the above described matters, the multiplier according to the embodiment is constituted to use XOR of $\text{sum}_{HA}(\ )$ and $\text{sum}_{FA}(\ )$ in the above equations 1 and 2 and embed the multiplier over $GF(2^n)$ in a portion thereof.

Figure 7:
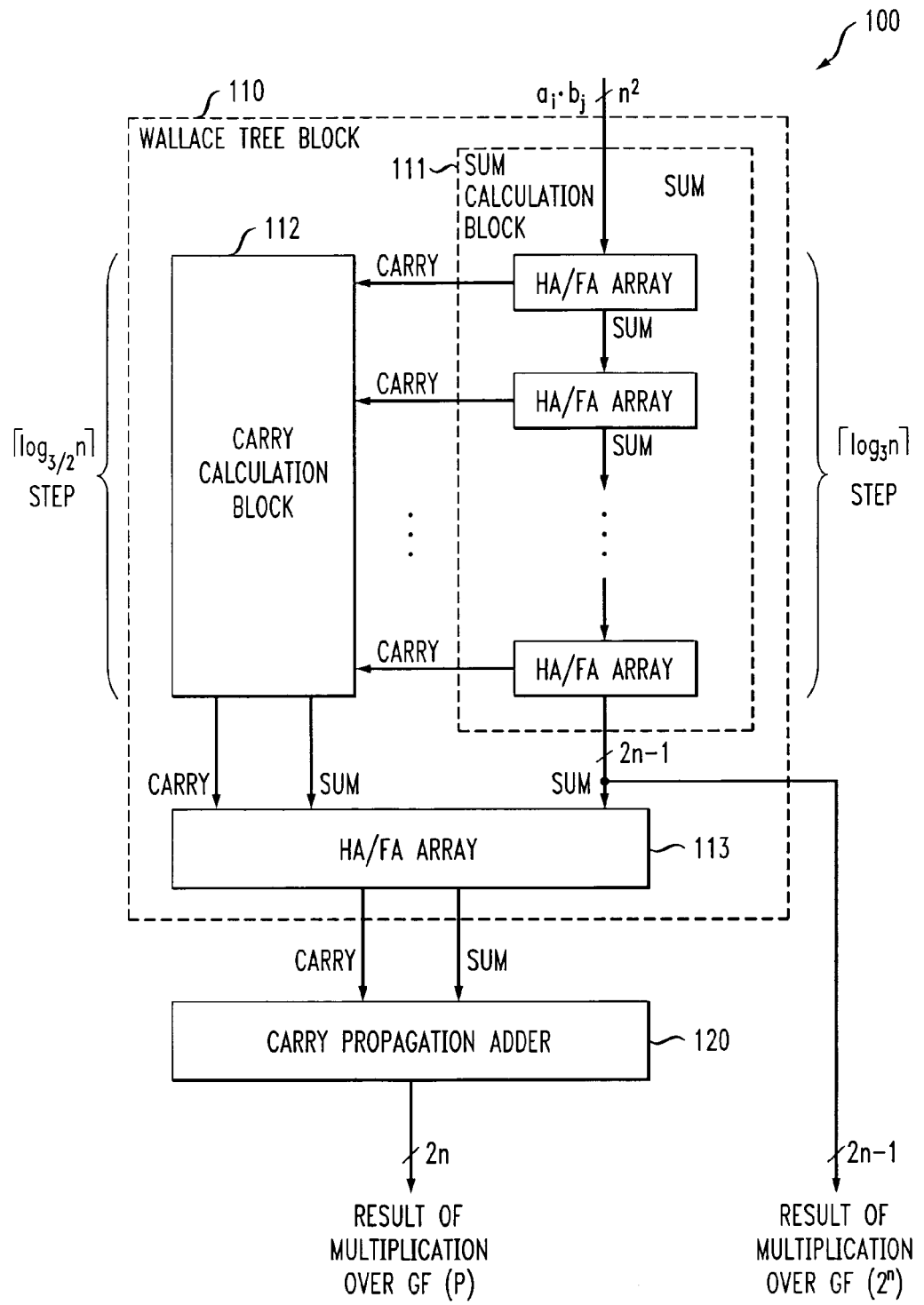
FIG. 7 is a diagram showing a structure of a multiplier, according to an embodiment of the present invention.

FIG. 7 is a diagram showing a configuration of the multiplier according to the embodiment.

Referring to FIG. 7, a multiplier 100 according to the embodiment includes a Wallace tree block 110 and a carry propagation adder 120. The Wallace tree block 110 includes a sum calculation block 111, a carry calculation block 112, and an HA/FA array 113. The sum calculation block 111 calculates sums and carries for input values for each digit. The carry calculation block 112 adds up the carries calculated by the sum calculation block 111. The HA/FA array 113 adds the calculation results from the sum calculation block 111 and the carry calculation block 112 and passes results of the addition to the carry propagation adder 120. In the sum calculation block 111, only addition terms by the XOR operation that are outputted from the half adders and the full adders are collected and outputted. The carry calculation block 112 collects all the terms other than the addition terms added in the sum calculation block 111 and performs addition including carry terms and the addition terms by the half adders and the full adders.

The carry propagation adder 120 is the same as a carry propagation adder in the usual parallel multiplier. In the carry propagation adder 120, the output of the HA/FA array 113 is converted into the two's complement form and outputted.

Specifically, the multiplier 100 of the embodiment first, similar to the usual integer multiplier, creates the carries and sums by the sum calculation block 111 composed of arrays of half adders and full adders (HA/FA arrays). While the Wallace tree block of the usual integer multiplier sequentially adds the carries and the sums in the same digit with no distinction, the Wallace tree block 110 in the multiplier 100 of the embodiment adds the carries and the sums in separate trees by using the carry calculation block 112 and the sum calculation block 111.

When only the sums are added up, in other words, XORed in the sum calculation block 111, a result of 2n−1 bits from the multiplication over $GF(2^n)$ is obtained. In the deepest path, n bits of the partial products can be added by XOR into one bit. Since the full adder outputs the sum of one bit for 3-bit input, total delay of the sum calculation block 111 is calculated based on FA conversion as equation 3:

$$\log_3 n$$

step.

On the other hand, in the circuitry of the carry calculation block 112, which can be composed in various ways, the full adder outputs two bits of the carry and the sum when three bits are inputted. Accordingly, the maximum delay is approximately calculated based on FA conversion as equation 4:

$$\log_{3/2} n$$

step.

As apparent from FIG. 7, the multiplier 100 according to the embodiment is constituted in such a manner that the sum calculation block 111 corresponding to the multiplier for $GF(2^n)$ is embedded inside the multiplier for $GF(p)$. Accordingly, when multiplication over $GF(2^n)$ is performed, as shown in FIG. 7, the result of the calculation by the sum calculation block 111 can be outputted without change.

The above-described delays of the sum calculation block 111 and the carry calculation block 112 show that the time taken for calculation of the sum calculation block 111 is much shorter than that of the carry calculation block 112. Therefore, since the sum calculation block 111 (portion corresponding to the multiplier for $GF(2^n)$) is separated as shown in FIG. 7, the carry calculation block 112 is not made to wait for processing. Moreover, the sum calculation block 111 is composed by collecting the XOR terms originally contained in the integer multiplier, so that the circuits constituting the entire multiplier 100 do not increase.

In other words, the multiplier 100 according to the embodiment can perform multiplication over $GF(p)$ and $GF(2^n)$ without reducing the processing speed and increasing circuits in size.

Figure 8:
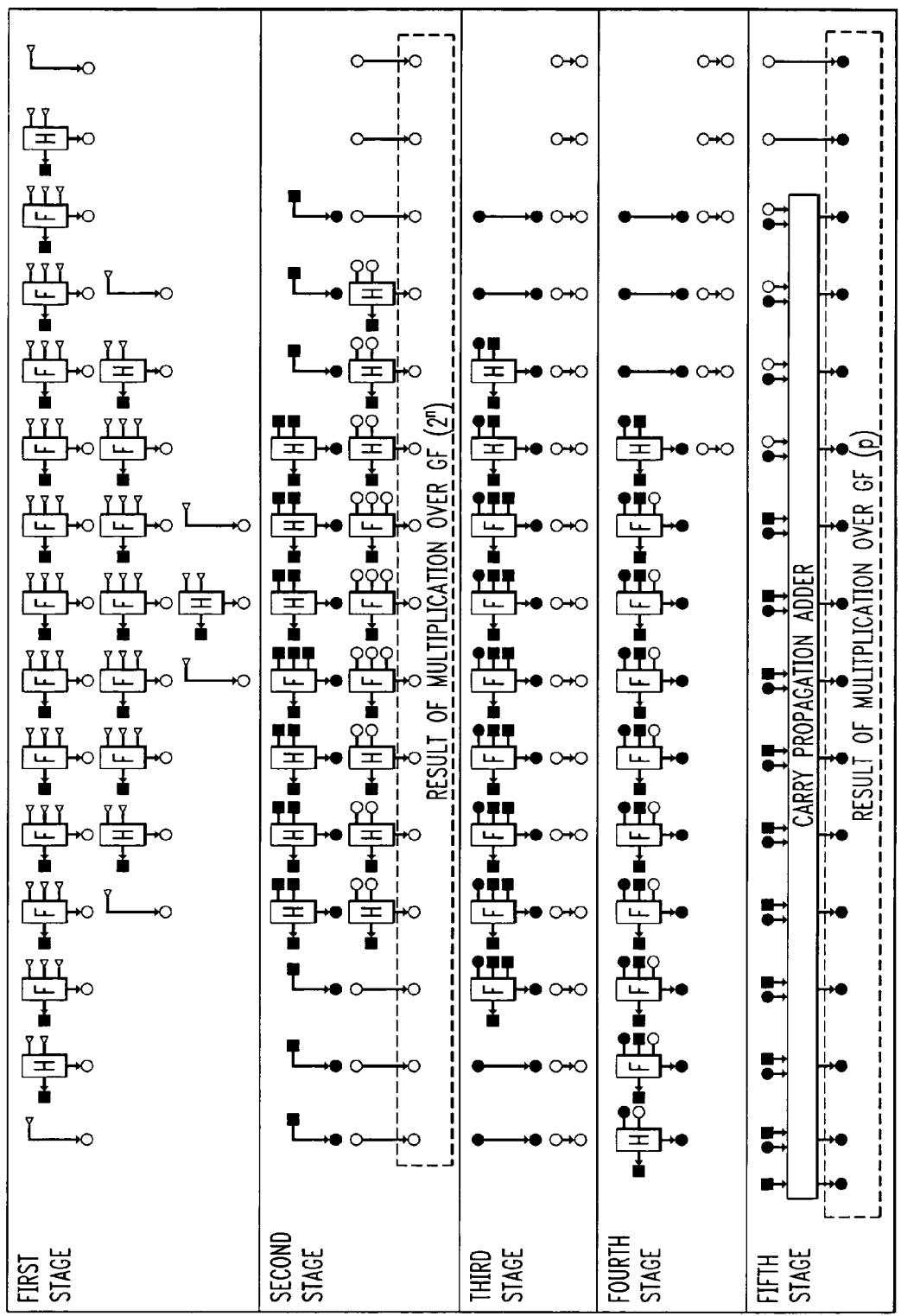
FIG. 8 is a configuration example showing a Wallace tree block in the multiplier of the embodiment which performs 8-bit by 8 bit multiplication shown in FIG. 1, according to an embodiment of the present invention.

FIG. 8 is a diagram showing a configuration example of the Wallace tree block 110 in the multiplier 100 of the embodiment, which performs 8-bit by 8-bit multiplication shown in FIG. 1. In FIG. 8, the half adders are represented by blocks with "H," and the full adders are represented by blocks with "F," which follow FIGS. 4 and 5.

The Wallace tree block 110 shown in FIG. 8 is composed of five stages. In FIG. 8, inputs with triangles denote the partial products; inputs and outputs with white circles denote the sums (hereinafter, referred to as first sums) in the arithmetic for $GF(p)$ and $GF(2^n)$; inputs and outputs with black circles denote sums (hereinafter, referred to as second sums) only in the arithmetic over $GF(p)$; and inputs and outputs with black squares denote carries in the operation on $GF(p)$. For the convenience of description, the configuration of the Wallace tree block 110 shown in FIG. 8 includes some redundancy.

In a first stage, partial products of each digit are inputted and the carries and the first sums are outputted.

In a second stage, the carries obtained in the first stage are added up and the second sums are outputted. Moreover, the first sums obtained in the first stage are added up and carries and first sums are outputted. Herein, the first stage and the step in the second stage where the first sums are added up corresponding to the sum calculation block 111 of the Wallace tree block 110 shown in FIG. 7. In other words, the first sums outputted in the second stage are the result of the multiplication over $GF(2^n)$.

In a third stage, the carries and the second sums obtained in the second stage are added up, and carries and second sums as results of the addition are outputted. The first sums obtained in the second stage are passed through the third stage. The step in the third stage where the carries and the second sums are added up corresponds to the carry calculation block 112 of the Wallace tree unit 110 shown in FIG. 7.

In a fourth stage, the carries and the second sums obtained in the third stage and the first sums obtained in the second stage and passed through the third stage are added up, and carries and second sums as results of the addition are outputted. In some low digits, the first sums or the second sums are not added and pass through the fourth stage. The fourth stage corresponds to the HA/FA array 113 of the Wallace tree block 110 shown in FIG. 7.

In a fifth stage, the carries and the second sums obtained in the fourth stage and the first and second sums passing through the fourth stage are added up, and second sums as results of the addition are outputted. The fifth stage corresponds to the carry propagation adder 120 shown in FIG. 7. In other words, the second sums outputted in the fifth stage are the results of the multiplication over GF(p).

The following equation 5 expresses the portion of the first stage in the multiplier 100 of the embodiment in arbitrary n-bit multiplication:

$$g_{k,j} = a_i \cdot b_j \ (k = i+j, 0 \le i, j < n)$$

$$\{s_{k,0}, \cdots, s_{k,[n-|k-n|]/3}\} =$$

$$\begin{cases} \{sum_{FA}(g_{k,0}, g_{k,1}, g_{k,2}), \cdots, g_k\} & (|n-k| \bmod 3 = 0) \\ \{sum_{FA}(g_{k,0}, g_{k,1}, g_{k,2}), \cdots, sum_{HA}(g_{k,k-1}, g_k)\} & (|n-k| \bmod 3 = 1) \\ \{sum_{FA}(g_{k,0}, g_{k,1}, g_{k,2}), \cdots, sum_{FA}(g_{k,k-2}, g_{k,k-1}, g_k)\} & (|n-k| \bmod 3 = 2) \end{cases}$$

$$\{c_{k,0}, \cdots, c_{k,[n-|k-n|]/3}\} =$$

$$\begin{cases} \{carry_{FA}(g_{k,0}, g_{k,1}, g_{k,2}), \cdots, carry_{HA}(g_{k,k-1}, g_k)\} & (|n-k| \bmod 3 = 1) \\ \{carry_{FA}(g_{k,0}, g_{k,1}, g_{k,2}), \cdots, carry_{FA}(g_{k,k-2}, g_{k,k-1}, g_k)\} & (|n-k| \bmod 3 = 0 \text{ or } 2) \end{cases}$$

In the multiplier 100 of the embodiment constituted as described above, the Wallace tree block 110 can be easily constituted to incorporate one or a plurality of addition terms other than the partial products $a_i b_j$ of the inputs $A(a_{n-1}, \ldots a_1, a_0)$ and $B(b_{n-1}, \ldots b_1, b_0)$, which are the arithmetic objects. Therefore, it is easy to realize a multiply-add operation function of, for example, adding an input C to the product of the inputs A and B.

Figure 9:
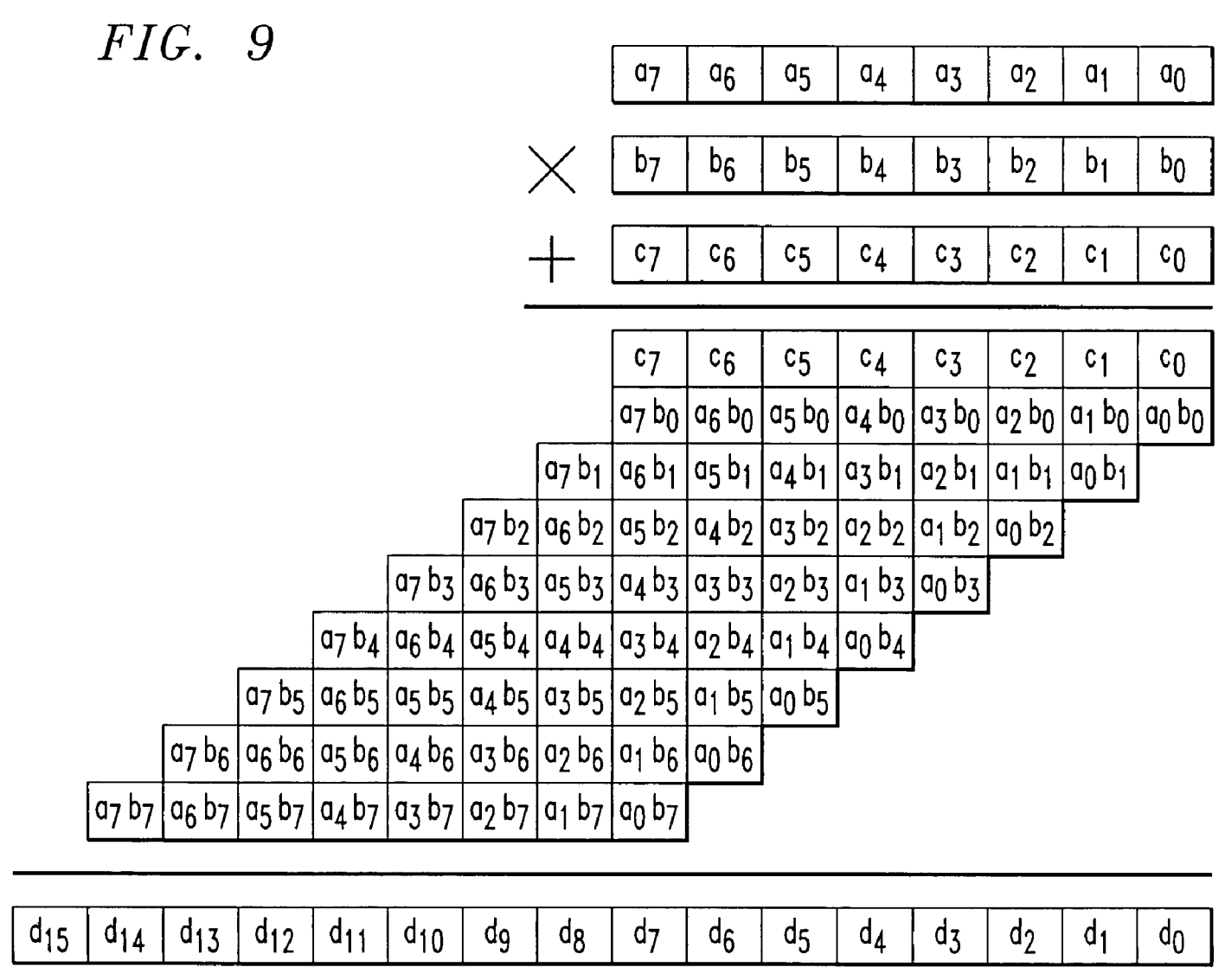
Figure 10:
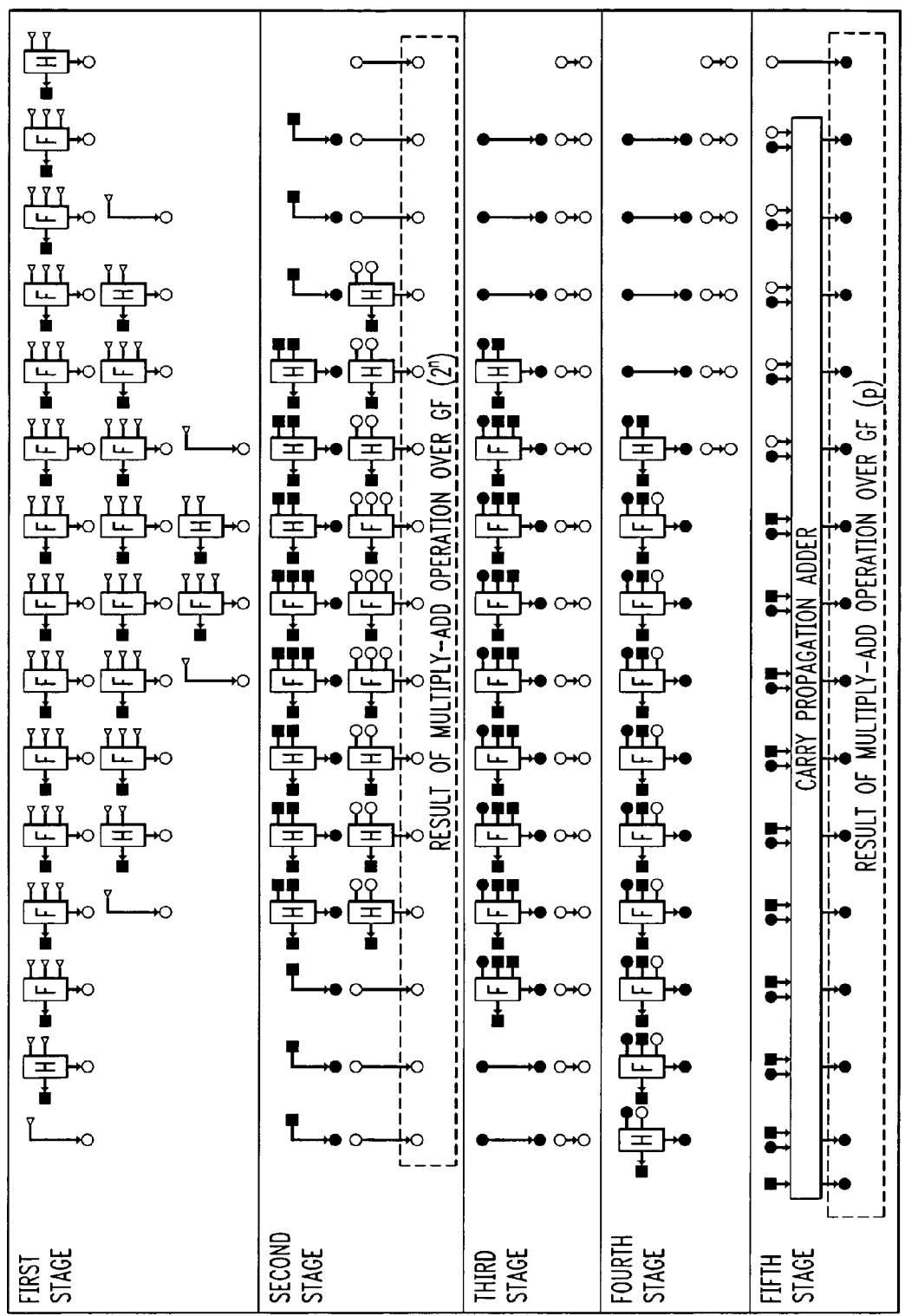
FIG. 10 is a diagram showing a configuration example of the Wallace tree block in the multiplier of the embodiment which performs the 8-bit multiply-add operation shown in FIG. 9, according to an embodiment of the present invention.

FIG. 9 is a view showing an image of the multiply-add operation of adding an 8-bit input C to the product of the 8-bit inputs A and B shown in FIG. 1 for each digit. FIG. 10 is a diagram showing a configuration example of the Wallace tree block 110 in the multiplier of the embodiment which performs the 8-bit multiply-add operation shown in FIG. 9. The half adders and the full adders in FIG. 10 are expressed the same as that in FIG. 9.

Comparing the Wallace tree block 110 of FIG. 10 with the Wallace tree block 110 of FIG. 8, an adder for adding the input $C=(c_7, c_6, \ldots, c_0)$ to the partial products in the low eight digits in A×B, but processing contents thereof in each stage are the same.

According to the above-described multiplier 100 of the embodiment, one multiplier 100 can perform two types or arithmetic, which are the arithmetic over GF(p) and the arithmetic over GF($2^n$), the circuit incorporating the multiplier 100 can implement these types of arithmetic without increasing in size.

Since the multiplier 100 of the embodiment is an n-bit by n-bit parallel multiplier, for example, in the case of 32 bit bus (n=32), the multiplier 100 of the embodiment can perform processing of the same level as that of a serial multiplier based on a 1024-bit adder at higher speed (32×32=1024). Accordingly, the multiplier 100 has high flexibility for change in size (data bit length) of data as the arithmetic object. The multiplier 100 also has very high processing performance ability for a circuit quantity.

Furthermore, since one multiplier 100 can perform two types of arithmetic over GF(p) and GF($2^n$), the multiplier 100 of the embodiment is available in various applications that the coding theory is applied to. As a most typical example, the multiplier 100 is used as an arithmetic unit in the cipher circuit implementing the public-key cryptography of the elliptic curve cryptosystem.

Figure 11:
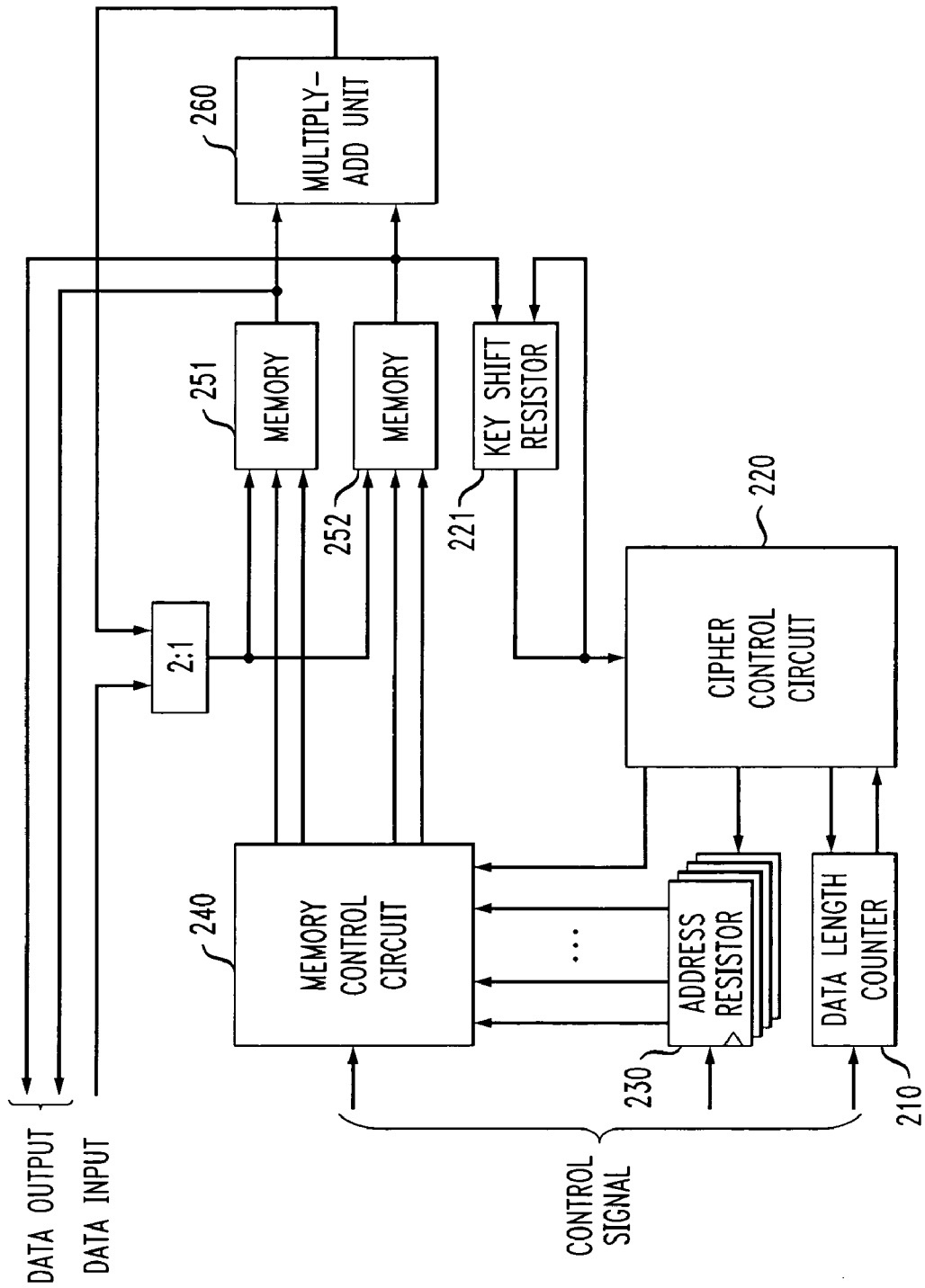
FIG. 11 is a diagram showing a configuration example of a cipher circuit incorporating the multiplier according to the embodiment, according to an embodiment of the present invention.

FIG. 11 is a diagram showing a configuration example of a circuit of the public-key cryptography incorporating the multiplier 100 according to the embodiment.

The cipher circuit shown in FIG. 11 includes a data length counter 210, a cipher control circuit 220, a key shift register 221, an address register 230, a memory control circuit 240, memories 251 and 252, and a multiply-add unit 260. The data length counter 210 is a control means in processing (hereinafter, referred to as cipher processing) of data encryption or decryption. The memories 251 and 252 are holding means for holding data to be processed. The multiply-add unit 260 is a means for executing the cryptography processing.

In this cipher circuit, parameters (key and the like) used for encryption or decryption of data are set by the cipher control circuit 220 and the key shift register 221 to a data size specified in the data length counter 210. Subsequently, by control of the address register 230 and the memory control circuit 240, input data held in the memories 251 and 252 and the parameters set by the cipher control circuit 220 are passed to the multiply-add unit 260. The multiply-add unit 260 performs arithmetic processing for encryption or decryption of the input data. For this multiply-accumulate unit 260, the multiplier 100 of the embodiment can be used.

In this cipher circuit, the multiply-add unit 260 performs the arithmetic over GF(p) and the arithmetic over GF($2^n$) in the cipher processing, for example, in the case of supporting the DSA signature in the elliptic curve cryptosystem or using a combination of the elliptic curve cryptosystem and the RSA system.

In the arithmetic in the cipher processing of the RSA system or the DSA signature of the elliptic curve cryptosystem, the arithmetic over GF(p) is required. Accordingly, the output of the carry propagation adder 120 of the multiplier 100 constituting the multiply-add unit 260 is outputted as the arithmetic result.

On the other hand, in the arithmetic in the cipher processing of the elliptic curve cryptosystem, the arithmetic over GF($2^n$) is required. Accordingly, the output of the sum calculation block 111 of the multiplier 100 constituting the multiply-add unit 260 is outputted as the arithmetic result.

Another application that the multiplier 100 of the embodiment is available for is an error correcting circuit.

Figure 12:
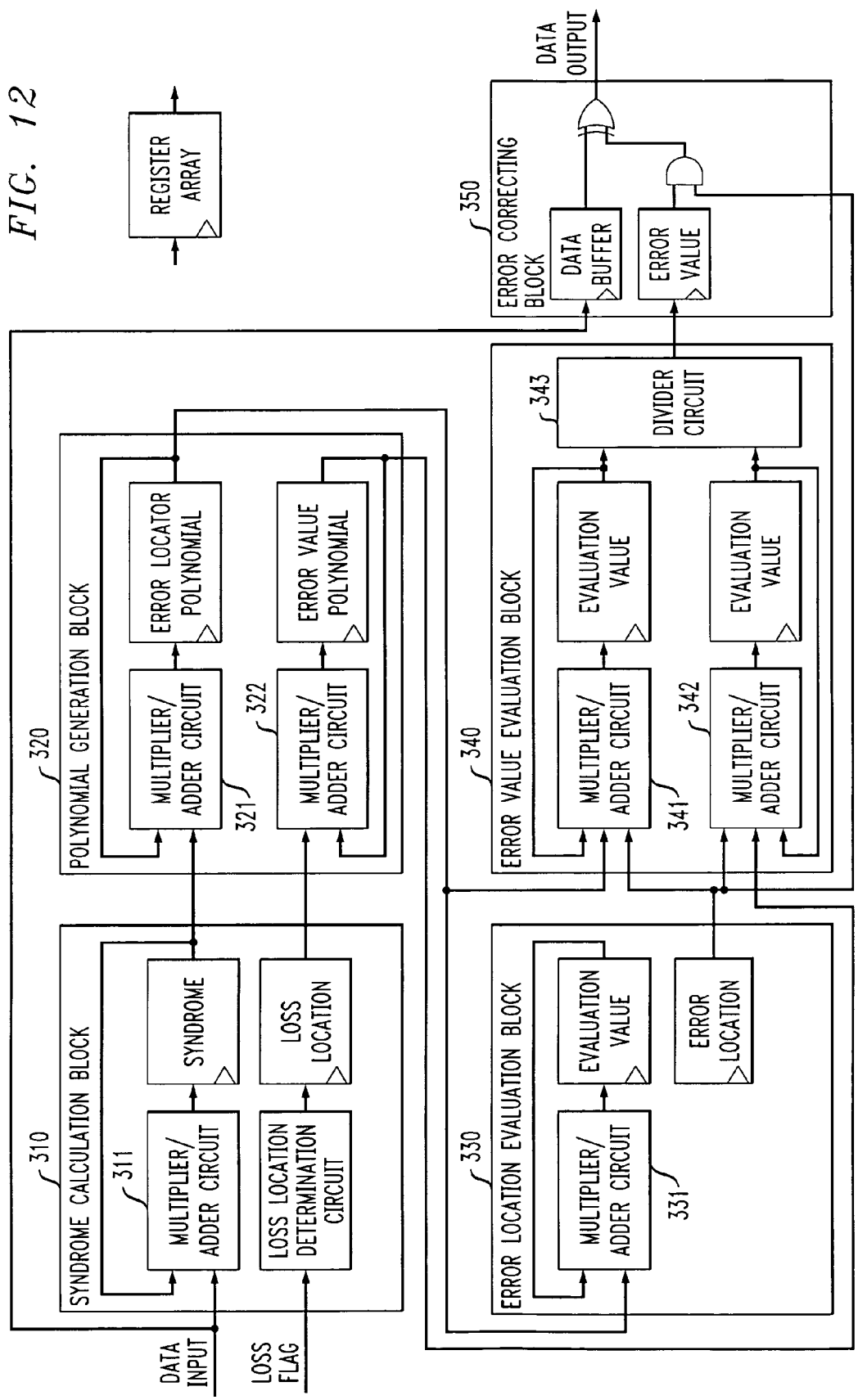
FIG. 12 is a diagram showing a configuration example of an error correcting circuit incorporating the multiplier circuit according to the embodiment.

FIG. 12 is a diagram showing a configuration example of the error correcting circuit incorporating the multiplier 100 according to the embodiment.

The error correcting circuit shown in FIG. 12 includes a syndrome calculation block 310, a polynomial generation block 320, an error location evaluation block 330, an error value evaluation block 340, and an error correcting block 350. The syndrome calculation block 310 creates a syndrome in accordance with an error pattern of data. If there is a loss of data, the syndrome calculation block 310 determines a location of the lost data. The polynomial generation block 320 generates a polynomial (error locator polynomial) for calculating the error location and a polynomial (error value polynomial) for calculating the error pattern from the syndrome and information of the location of the lost data. The error location evaluation block 330 calculates an error location based on the error locator polynomial generated in the polynomial generation block 320. The error value evaluation block 340 calculates an error value based on the error location calculation block 330 and the error value polynomial generated in the polynomial generation block 320. The error correcting block 350 corrects the error by XORing data corresponding to the error location calculated in the error location evaluation block 330 and the error value calculated in the error value evaluation unit 340.

In this error correcting circuit, the multiplier 100 of the embodiment is used for multiply-add circuits 311, 321, 322, 331, 341, and 342 and a divider circuit 343, which constitute the syndrome calculation block 310, the polynomial generation block 320, the error location evaluation block 330, and the error value evaluation block 340. The result of the arithmetic over $GF(2^n)$ is then outputted from the sum calculation block 111 of the multiplier 100.

As described above, according to the present invention, a multiplier circuit can be provided, which can be used as a usual integer multiplier and a multiplier for $GF(2^n)$ without increasing in size.

Furthermore, the multiplier circuit according to the present invention is available for various applications that the coding theory is applied to. When this multiplier circuit is mounted on a cipher circuit, the cipher circuit can implement, for example, the elliptic curve cryptography or the public key cryptography of a modular multiplication system including the RSA system, which requires two types of arithmetic, arithmetic over $GF(p)$ and arithmetic over $GF(2^n)$, with one accelerator core.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A multiplier, comprising:
   a Wallace tree block calculating partial products for two input values as objects of multiplication and adding the partial products into a redundant binary form; and
   a carry propagation adder converting a redundant binary number outputted from the Wallace tree block into a resulting product in two's complement form, wherein the Wallace tree block comprises:
   a sum calculation block adding the partial products, and
   a carry calculation block adding carries generated by the sum calculation block.

2. The multiplier according to claim 1, wherein a result of the calculation of the sum calculation block is outputted as a result of the multiplication over an extension field of two.

3. The multiplier according to claim 1, wherein the carry propagation adder adds a result of the calculation of the sum calculation block and a result of the calculation of the carry calculation block and outputs a result of the addition as a result of the multiplication for integers.

4. A multiplier, comprising:
   a Wallace tree block calculating partial products for two input values as objects of multiplication and adding the partial products into a redundant binary form; and
   a carry propagation adder converting a redundant binary number outputted from the Wallace tree block into a resulting product in two's complement form, wherein the Wallace tree block comprises:
   a sum calculation block adding the partial products, wherein the sum calculation block performs multiply and add operations by adding another value for each corresponding digit to the partial products, and
   a carry calculation block adding carries generated by the sum calculation block.

5. A multiplier multiplying two input values as objects of multiplication by calculating partial products for the two input values and adding the partial products using half adders and full adders, the multiplier comprising:
   multiplication means for calculating a sum of the partial products and outputting the sum as a result of the multiplication in the case that the input values are elements in an extension field of two;
   carry addition means for adding carries generated in the calculation of the multiplication means; and
   addition means for adding a result of the calculation of the multiplication means and a result of the calculation of the carry addition means and outputting a result of the addition as the result of the multiplication in the case where the input values are integers.

6. The multiplier according to claim 5, wherein the multiplication means collects and outputs only addition terms by an exclusive OR operation, addition terms being outputted from the half adders and the full adders.

7. The multiplier according to claim 6, wherein the carry adder means collects terms other than the addition terms added by the multiplication means and performs addition including the carry terms and the addition terms by the half adders and the full adders.

8. The multiplier according to claim 6, wherein a multiply and add operation is performed by adding the addition terms of the partial products in the multiplication means to other addition terms.

9. A cipher circuit, comprising:
   arithmetic means for performing arithmetic for encryption or decryption of data; and
   control means for controlling the arithmetic by the arithmetic means;
   wherein the arithmetic means comprise a multiplier using half adders and full adders and comprises:
   a Wallace tree block calculating partial products for two input values as objects of multiplication and adding the partial products into a redundant binary form; and
   a carry propagation adder converting a redundant binary number outputted from the Wallace tree block to a resulting product in two's complement form; and
   wherein the Wallace tree block comprises:
   a sum calculation block adding the partial products, and
   a carry calculation block adding carries generated by the sum calculation block.

10. The cipher circuit according to claim 9, wherein the arithmetic means outputs a result of the calculation of the sum calculation block in the case of arithmetic over a finite field GF($2^n$) and outputs a result of the calculation of the carry calculation block in the case of arithmetic over a finite field GF(p).

11. The cipher circuit according to claim 9, wherein the sum calculation block collects and outputs only addition terms by an exclusive OR operation outside of the arithmetic means, the addition terms being outputted from the half adders and the full adders.

12. The cipher circuit according to claim 9, wherein the carry calculation block collects terms other than addition terms added by the multiplication means and performs addition including the carry terms and the addition terms by the half adders and the full adders.

13. A cipher circuit, comprising:
arithmetic means for performing arithmetic for encryption or decryption of data; and
control means for controlling the arithmetic by the arithmetic means;
wherein the arithmetic means comprises a multiplier which multiplies two input values as objects of multiplication by calculating partial products for the input values and adding the partial products using half adders and full adders and the arithmetic means comprises:
multiplication means for calculating a sum of the partial products for each digit and outputting the sum as a result of the multiplication in the case that the input values are elements of a finite field GF($2^n$); and
carry addition means for adding carries generated in the calculation of the multiplication means; and
addition means for adding a result of the calculation of the multiplication means and a result of the calculation of the carry addition means and outputting a result of the addition as a result of the multiplication in the case where the input values are integers.

* * * * *